United States Patent
Vroemen

(10) Patent No.: US 12,135,080 B2
(45) Date of Patent: Nov. 5, 2024

(54) TRANSMISSION SYSTEM FOR A VEHICLE, AND CONTROL METHOD FOR A TRANSMISSION

(71) Applicant: PUNCH POWERTRAIN PSA E-TRANSMISSIONS NV, Sint-Truiden (BE)

(72) Inventor: Bas Gerard Vroemen, Sint-Truiden (BE)

(73) Assignee: PUNCH POWERTRAIN PSA E-TRANSMISSIONS NV, Sint-Truiden (BE)

( * ) Notice: Subject to any disclaimer, the term of this patent is extended or adjusted under 35 U.S.C. 154(b) by 568 days.

(21) Appl. No.: 17/295,389

(22) PCT Filed: Nov. 20, 2019

(86) PCT No.: PCT/EP2019/081990
§ 371 (c)(1),
(2) Date: May 19, 2021

(87) PCT Pub. No.: WO2020/104559
PCT Pub. Date: May 28, 2020

(65) Prior Publication Data
US 2022/0003310 A1  Jan. 6, 2022

(30) Foreign Application Priority Data
Nov. 20, 2018 (BE) .................................. 2018/5811

(51) Int. Cl.
*F16H 61/12* (2010.01)
*F16H 61/688* (2006.01)

(52) U.S. Cl.
CPC ........... *F16H 61/12* (2013.01); *F16H 61/688* (2013.01); *F16H 2061/1204* (2013.01);
(Continued)

(58) Field of Classification Search
CPC .................. F16H 61/12; F16H 61/688; F16H 2061/1204; F16H 2061/1232; F16H 2061/1276; F16H 2061/1288
See application file for complete search history.

(56) References Cited

U.S. PATENT DOCUMENTS 5,627,750 A    5/1997  Kono et al.

FOREIGN PATENT DOCUMENTS

DE       19952352 A1    5/2001
DE    102010033836 A1    3/2011
(Continued)

OTHER PUBLICATIONS

International Search Report dated Jan. 7, 2020, issued in corresponding International Patent Application No. PCT/EP2019/081990 (2 pgs.).

*Primary Examiner* — William C Joyce
(74) *Attorney, Agent, or Firm* — Pillsbury Winthrop Shaw Pittman, LLC

(57) ABSTRACT

A transmission system for a vehicle comprises a first partial transmission with a first controllable clutch and a second partial transmission with a second controllable clutch each forming a respective transmission path between an input and a common output (to), the first and the second controllable clutches having first and second actuators, respectively, to control an operational state of said controllable clutches. A controller is provided to control the first and the second actuators, the controller being configured to selectively assume one of a plurality of control modes. These include amongst others a safety control mode which is selected upon detecting that a value of an acceleration of the vehicle is lower than a negative threshold value.

4 Claims, 5 Drawing Sheets

(52) U.S. Cl.
CPC ............... *F16H 2061/1232* (2013.01); *F16H 2061/1276* (2013.01); *F16H 2061/1288* (2013.01)

(56) References Cited

FOREIGN PATENT DOCUMENTS

| | | |
|---|---|---|
| DE | 102016219793 B3 | 2/2018 |
| EP | 1460317 A2 | 9/2004 |
| FR | 2 955 820 * | 8/2011 |

* cited by examiner

TRANSMISSION SYSTEM FOR A VEHICLE, AND CONTROL METHOD FOR A TRANSMISSION

CROSS-REFERENCE TO RELATED APPLICATIONS

This application claims priority to PCT/EP2019/081990, filed Nov. 20, 2019, which in turn claims priority to BE 2018/5811, filed Nov. 20, 2018, all contents of each of which are hereby incorporated by reference in their entireties.

BACKGROUND OF THE INVENTION

Field of the Invention

The present invention relates to a transmission system for a vehicle.

The present invention still further relates to a control method for a transmission.

Related Art

Transmission systems are known that have a first and a second partial transmission, each having a respective clutch unit. In a stationary operational state one of the partial transmissions has its clutch unit in a closed state, so that it provides for the transmission of the power of the engine to the wheels at the transmission ratio defined by that partial transmission. The other one has its clutch unit opened so that it is inactive, i.e. not contributing in the transmission. Upon a need to shift gear, a controller prepares the inactive partial transmission to assume the desired transmission ratio, and in a subsequent stage controls the first clutch unit to gradually decouple and the second clutch unit to gradually couple. The manner in which this process takes place may depend on whether the shift of gear is from a lower gear to a higher gear or reversely. Also, this may depend on whether the torque transferred by the motor is positive or negative (the motor tends to accelerate the vehicle or instead tends to decelerate the vehicle). In case the shift of gear is from lower to higher, and the delivered torque is positive, the process may subsequently include a torque phase and a speed phase. During the torque phase the clutch (second clutch) for the higher gear is gradually engaged while the clutch (first clutch) for the lower gear is maintained in a locked mode. Therewith the second clutch gradually transmits a larger portion of the torque delivered by the motor until the contribution of the first clutch is reduced to 0. At this point the first clutch can be decoupled. Decoupling can take place in a short time-interval as at that point in time the first clutch does not contribute in the transmission of torque. Then, in the speed phase, the second clutch is further engaged until it is locked and provides for a slip-free transmission.

In case the shift of gear is from higher to lower, and the delivered torque is positive, the process may subsequently include a speed phase and a torque phase. During the speed phase the second clutch is gradually disengaged and starts to slip. providing a higher engine [/motor] torque than the (possibly constant) torque transmitted by the second clutch, the engine can speed up while the torque to the vehicle stays (possibly) constant. This may proceed until the rotational speed at the output of the still disengaged first clutch is equal to the rotation speed at its input. At this point, the first clutch can be engaged, and subsequently, the second clutch can be further disengaged until the torque from the motor is fully transferred via the first clutch.

In case the vehicle is driving down a mountain for example, and the motor is used to break the vehicle, the transferred torque is negative. When shifting towards a higher gear in that case a different procedure may be followed in comparison to the case of a positive torque transfer. Contrary to that case, the procedure may start with a speed phase, wherein the first clutch is gradually disengaged. At the same time, the rotational speed of the motor may be reduced, so that the torque towards the vehicle remains the same. This may proceed until the rotational speed at the output of the still disengaged second clutch is equal to the rotation speed at its input. At this point, the second clutch can be engaged, and subsequently, the first clutch can be further disengaged until the torque from the motor is fully transferred via the second clutch.

When shifting towards a lower gear in case of a negative torque transfer, the procedure may start with a torque phase, wherein the first clutch is gradually engaged until the negative torque is fully transferred by that clutch. The second clutch is then disengaged and subsequently the first clutch is further engaged until it is fully locked.

Therewith such a transmission system, when correctly functioning may provide for a smooth change of gear and an uninterrupted delivery of power to the wheels of the vehicle. In case of a malfunctioning component, for example a clutch actuator, or a control component, it may happen that one of the clutch units provides an excessive torque, as a result of which the combined torque that the two clutches exert on the output will attain a negative value, potentially large enough to cause unintended hard braking of the vehicle. Although this rarely occurs, the results may be disastrous, as it would result in an abrupt uncontrolled braking of the vehicle.

SUMMARY OF THE INVENTION

It is an object of the invention to provide a transmission system for a vehicle that mitigates this risk.

It is a further object of the invention to provide a vehicle comprising the transmission system.

It is a still further object of the invention to provide a control method for a transmission that mitigates the above-mentioned risk.

In accordance with the first object, a transmission system is provided as claimed in claim 1. Amongst others, a controller of the claimed transmission system has additional control modes to control a first and a second controllable clutch. These include one or more of:

a first safety control mode wherein the first controllable clutch is in a decoupled state and the second controllable clutch is in a slipping state, and a second safety control mode wherein the first controllable clutch is in a slipping state and the second controllable clutch is in a decoupled state, and in that the controller selects a safety control mode instead of a transitional control mode upon detecting that a value of an acceleration of the vehicle is lower than a negative threshold value.

If a malfunction as described above, would occur in the transmission system, the vehicle would rapidly brake. Hence its acceleration would be negative. The negative threshold value is set to prevent frequent transitions to a safety control mode, which is unwanted from a driveability point of view. Such a negative threshold is allowed from a safety point of view, since (incidental) moderate unwanted decelerations might be uncomfortable, but are not safety critical.

The negative threshold may for example be set at a value selected from a range between −1.5 to −2.5 m/s², for example −2 m/s².

Upon detecting an acceleration of the vehicle lower than the negative threshold value, the controller assumes a safety control mode wherein it decouples one of the controllable clutches. As a result thereof the partial transmission systems are no longer in a power loop, therewith mitigating the risk.

In an embodiment, the controller comprises a first control unit that is configured to control the controllable clutches in accordance with an operational mode selected from the first locked control mode, the second locked control mode, the first transitional mode and the second transitional mode and comprises a second control unit that is configured to overrule the first control unit by selecting a safety control mode instead of a transitional control mode upon detecting that a value of an acceleration of the vehicle exceeds a threshold value. By providing the controller as a combination of a primary control unit and a safety control unit that is capable of overruling the primary control unit the risk that programming and/or hardware errors related to other control functionalities could impair the reliability of the safety functionality is strongly reduced.

In an embodiment, the transmission system has a further safety control mode. In this further safety control mode the controller issues control signals to direct both the first and the second controllable clutch in a decoupled state. The controller in this embodiment assumes the further safety control mode upon detecting in the first or the second safety control mode that a value of a deceleration of the vehicle persists to exceed a threshold value and the absolute value of the angular acceleration of the engine driving the input exceeds the maximum value. In exceptional cases it might occur that the one of the clutches that is to be decoupled in the first or the second safety mode does not respond, for example due to friction. In that case also the transition to the first or the second safety mode would not avoid the rapid negative acceleration of the vehicle. By controlling the other one of the clutches in a decoupled state, the power loop is removed. It is highly unlikely that both clutches are non-responsive. Nevertheless, it may be contemplated to include one further clutch between the output of the transmission and an axis towards the wheels of the vehicle. The controller could decouple the further clutch, if, even in the further safety control mode the extreme negative acceleration is detected.

Suppose that the controller CNTR has assumed the first locked control mode M1. In that case, it maintains the first controllable clutch C1 in a coupled state and maintains the second controllable clutch C2 in a decoupled state. Hence the transmission ratio from the input $c_{in}$ to the output $t_{out}$ is determined by the first partial transmission T1. In order to achieve a different transmission ratio, the controller CNTR may issue a control signal STA2 to the second partial transmission T2, to achieve that the latter assumes a setting with the desired transmission ratio, while it maintains the second controllable clutch C2 in a decoupled state. Once the second partial transmission T2 has achieved the setting specified by control signal STA2, or in case the second partial transmission T2 already had the specified setting, the controller CNTR normally assumes the first transitional control mode M12. Therein it controls the first controllable clutch C1 with control signal SCA1 to change its state from coupled to decoupled and it controls the second controllable clutch C2 with control signal SCA2 to change its state from decoupled to coupled. As specified above, the change of state may take place in a different order, depending on the circumstances such as the required torque direction and whether the shift of gear is an up-shift or a down-shift. As at least one of the clutches is in a slipping operational mode, during the transition, a virtually seamless transition can take place from the transmission ratio determined by the first partial transmission T1 to that determined by the second partial transmission T2.

A vehicle is provided as claimed in claim 5 that comprising a transmission system as specified above, as well as an engine to drive the vehicle via the transmission system. In an embodiment the controller upon assuming a safety control mode further bounds an absolute value of an angular acceleration ($|dNe/dt|$) of the engine to a predetermined maximum value. The predetermined maximum value may for example be selected in the range of 1200 to 1800 rpm/s, for example 1500 rpm/s. It may be the case that in the first or second safety operational mode, the closing of the active clutch is too harsh, potentially resulting in braking of the vehicle beyond the threshold. By bounding the absolute value of the angular acceleration ($|dNe/dt|$) of the engine to a predetermined maximum value this safety risk is mitigated.

The present invention further provides a method as claimed in claim 5.

BRIEF DESCRIPTION OF THE DRAWINGS

These and other aspects of the invention are described in more detail with reference to the drawings. Therein.

DETAILED DESCRIPTION OF EMBODIMENTS

Figure 1:
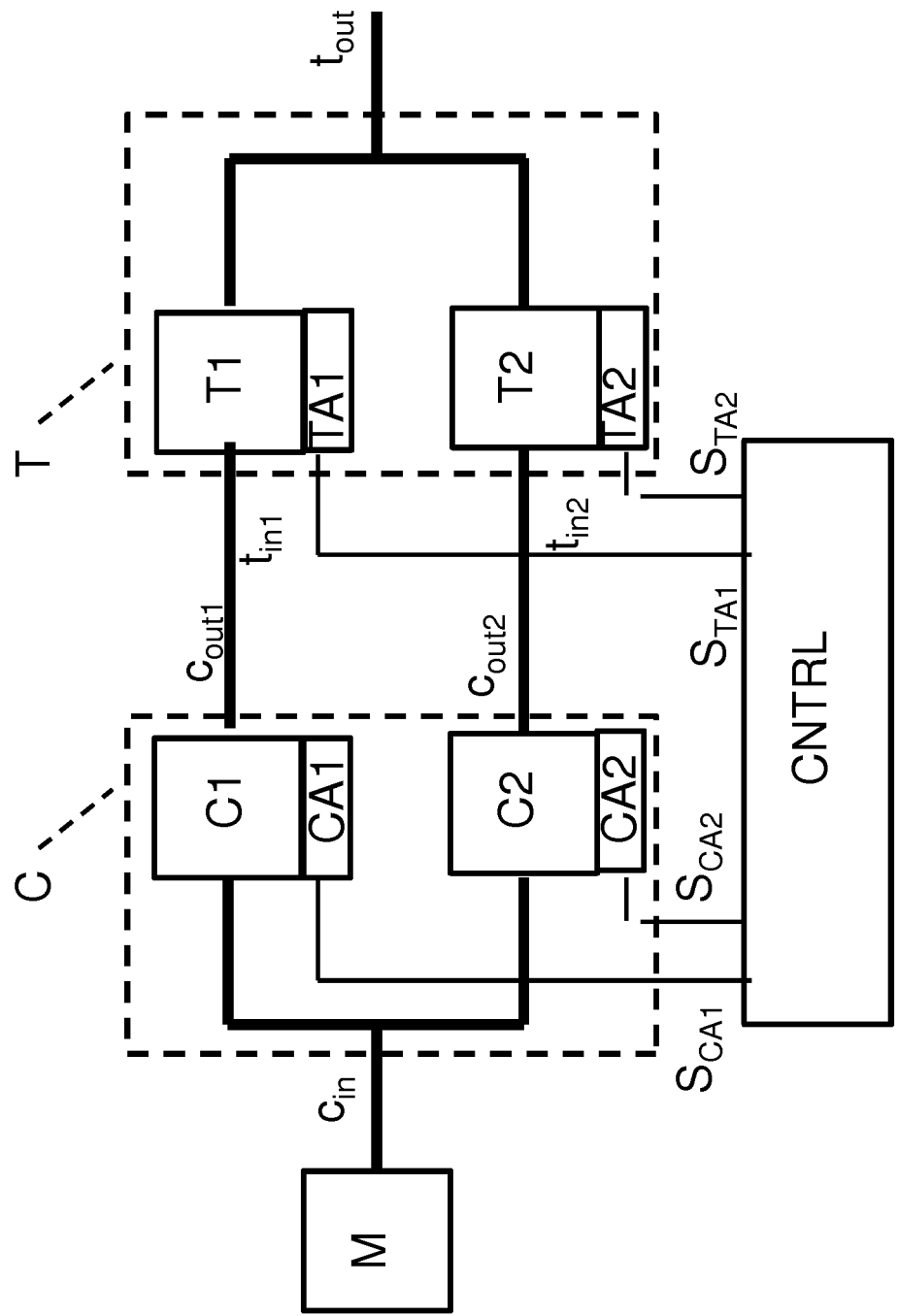
FIG. 1 schematically shows a transmission system for a vehicle.

FIG. 1 schematically shows a transmission system for a vehicle. The transmission system comprises a first partial transmission T1 with a first controllable clutch C1 and a second partial transmission T2 with a second controllable clutch C2. Each forming a respective transmission path between a common input ci and a common output to. The first and the second controllable clutch C1, C2 each have a respective actuating means CA1, CA2 that enables the controller CNTR to control an operational state of the controllable clutches with control signals $S_{CA1}$, $S_{CA2}$.

It is noted that in the embodiment shown, the first controllable clutch C1 is driven at input $c_{in}$ by engine M, for example a combustion engine or an electromotor, and at its output $c_{out1}$ it drives the first partial transmission T1, which has its output coupled to the common output $t_{out}$. Alternatively the first partial transmission T1 may have its input coupled to the input $c_{in}$ and have its output coupled to the input of the first controllable clutch C1. The same applies for the transmission path with the second partial transmission T2 and the second controllable clutch C2. The first and the second partial transmission T1, T2 may each have a controllable transmission ratio. In this case their transmission ratio is controllable by control signals STA1, STA2 provided by the controller CNTR. In an alternative embodiment a partial transmission T1, T2 may have a fixed transmission ratio.

The controller CNTR is configured to selectively assume one of a plurality of control modes. These include:
- a first locked control mode M1 wherein it maintains the first controllable clutch C1 in a coupled state and maintains the second controllable clutch C2 in a decoupled state,
- a second locked control mode M2 wherein it maintains the second controllable clutch C2 in a coupled state and maintains the first controllable clutch C1 in a decoupled state,
- a first transitional control mode M12, wherein the first controllable clutch C1 is controlled to gradually assume a decoupled state and the second controllable clutch C2 is controlled to gradually assume a coupled state, and
- a second transitional control mode M21, wherein the first controllable clutch C1 is controlled to gradually assume a coupled state and the second controllable clutch C2 is controlled to gradually assume a decoupled state. The first and the second transitional control mode both comprise a stage wherein the first and the second controllable clutch C1, C2 simultaneously have a partially decoupled operational state. In a partially decoupled state a slipping operation may occur, but this is not necessary, for example in case one of the partial transmissions has a freewheel component.

The clutch that in a transitional control state is gradually decoupled is also denoted as off-going clutch and the clutch that is gradually coupled is also denoted as the on-coming clutch. The following terminology is used in terms of gear shifting:
Power-on shift: a gear shift taking place while the engine drives the vehicle.
Power-off shift: a gear shift taking place while the engine brakes the vehicle.
Upshift: a gear shift towards a higher transmission ratio (output rotational speed/input rotational speed)
Downshift: a gear shift towards a lower transmission ratio.

The plurality of control modes of the controller further includes one or more of:
- a first safety control mode M122. Therein the first controllable clutch C1 is in a decoupled state and the second controllable clutch C2 is in a slipping state, and
- a second safety control mode M211 wherein the first controllable clutch C1 is in a slipping state and the second controllable clutch C2 is in a decoupled state. The controller selects a safety control mode M122, M211 instead of a transitional control mode M12, M21 when it detects that a value of an acceleration of the vehicle exceeds a threshold value.

Figure 2:
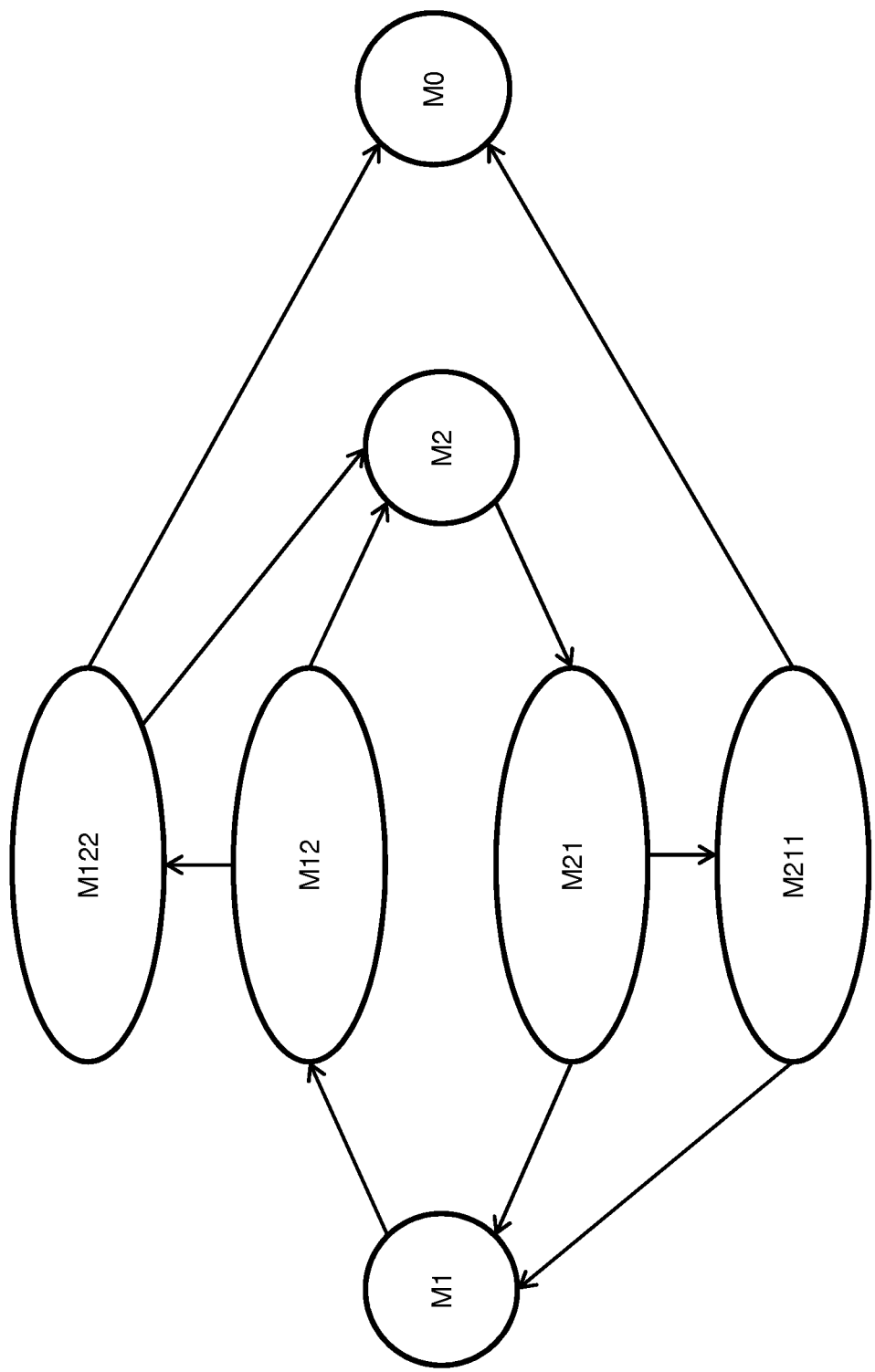
FIG. 2 shows an operational state diagram of an embodiment of a controller.

The relation between the various control modes is illustrated in FIG. 2. As can be seen in FIG. 2, the plurality of control modes further comprise a further safety control mode M0 in addition to the safety control modes referred to above. In this further safety control the controller causes both the first and the second controllable clutch to assume a decoupled operational state. The controller assumes the further safety control mode upon detecting in the first or the second safety control mode that a value of a deceleration of the vehicle persists to exceed the threshold value and the absolute value of the angular acceleration of the engine driving the input exceeds the maximum value.

Suppose that the controller CNTR has assumed the first locked control mode M1. In that case, it maintains the first controllable clutch C1 in a coupled state and maintains the second controllable clutch C2 in a decoupled state. Hence the transmission ratio from the input ci to the output to is determined by the first partial transmission T1. In order to achieve a different transmission ratio, the controller CNTR may issue a control signal $S_{TA2}$ to the second partial transmission T2, to achieve that the latter assumes a setting with the desired transmission ratio, while it maintains the second controllable clutch C2 in a decoupled state. Once the second partial transmission T2 has achieved the setting specified by control signal $S_{TA2}$, or in case the second partial transmission T2 already had the specified setting, the controller CNTR normally assumes the first transitional control mode M12. Therein it controls the first controllable clutch C1 with control signal $S_{CA1}$ to gradually assume a decoupled state and it controls the second controllable clutch C2 with control signal $S_{CA2}$ to gradually assume a coupled state, in a manner depending on the sign of the torque and on whether a gearshift is in an upwards or in a downwards direction. Therewith a virtually seamless transition takes place from the transmission ratio determined by the first partial transmission T1 to that determined by the second partial transmission T2. Likewise the controller may assume a second transitional control mode M21 to provide for a smooth transition between a transmission ratio determined by the second partial transmission T2 to that determined by the first partial transmission T1. Embodiments may be contemplated wherein the transmission system comprises more than two partial transmissions, each having their own controllable clutch. For example, if there are three partial transmissions, the controller can have one of them selected to provide the transmission between the input ci and the output co, and can prepare the other two, to provide for a lower and a higher transmission ratio than the present one, so that in each case a delay is avoided when selecting a next gear, whether a higher one or a lower one. In this case the controller may have a locked operational mode for each controllable clutch associated with a partial transmission, and a respective pair of transitional operational modes to provide for a transition between each pair of locked operational modes. In another embodiment the transmission system may have a plurality of partial transmissions having mutually different, fixed transmission ratios. In that case the controller may have a locked operational mode for each controllable clutch associated with a fixed partial transmission. It is not necessary that the controller has a transitional operational mode for each pair of locked operational modes. The controller may for example have a pair of transitional operational modes for each pair of a partial transmission and its successor partial transmission when ranked in transmission ratio.

In the inadvertent case that this primary control fails, in that the amount of torque with which the clutches operate during a transitional control mode is too high, the two partial transmissions (having mutually different transmission ratios) involved in the transitional mode are in a windup power loop. As a result a hazardous situation would arise wherein the vehicle would abruptly brake.

The controller CNTR is configured to mitigate this hazard in that its potential control modes further include one or more of:
- a first safety control mode M122. Therein the first controllable clutch C1 is in a decoupled state and the second controllable clutch C2 is in a slipping state, and
- a second safety control mode M211 wherein the first controllable clutch C1 is in a slipping state and the second controllable clutch C2 is in a decoupled state. If the controller detects that that an acceleration of the vehicle assumes a value lower than a threshold value, it assumes one of these safety control modes.

Figure 3:
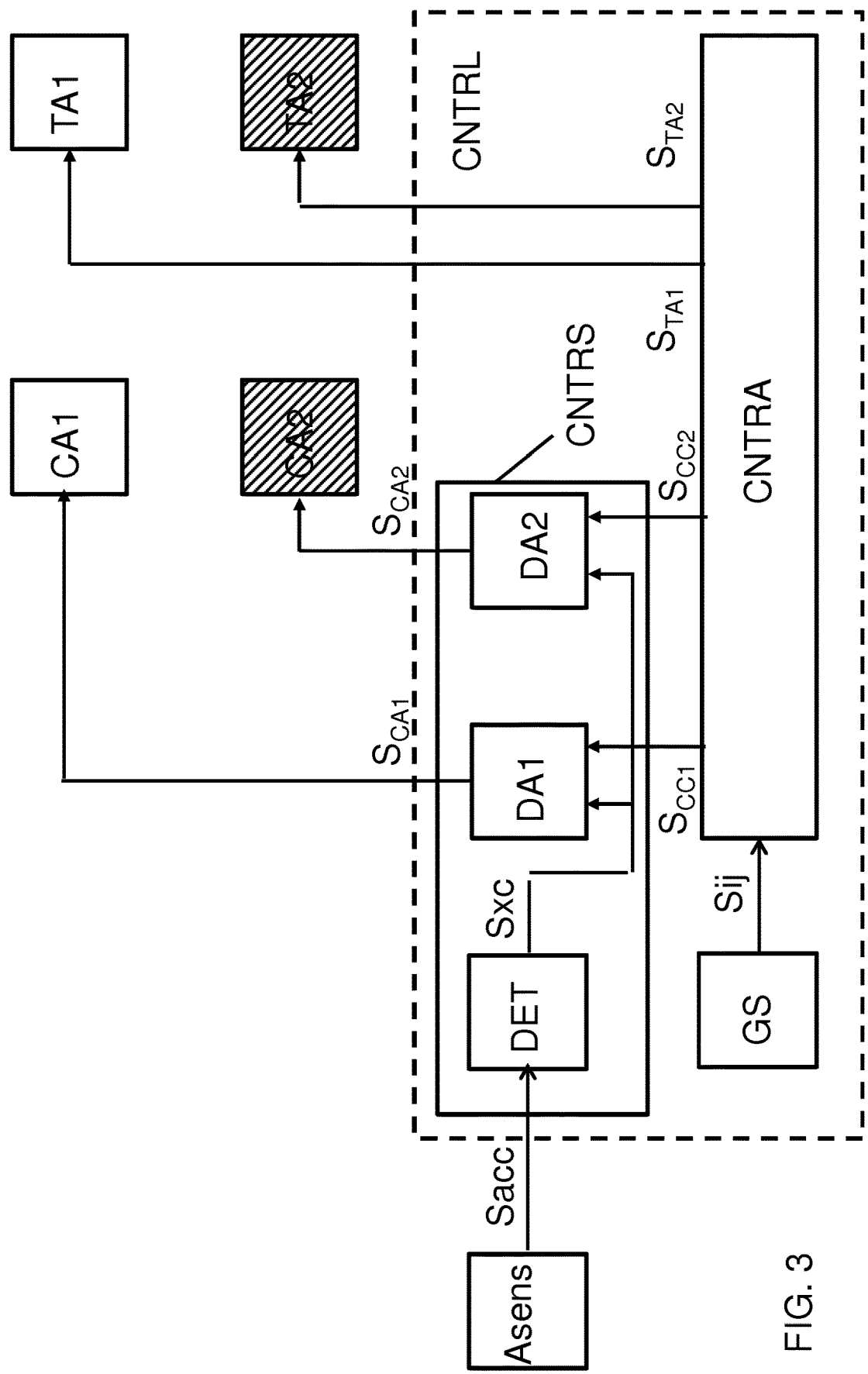
FIG. 3 shows in more detail an embodiment of a controller.

FIG. 3 shows in more detail an embodiment of the transmission system. In the embodiment shown the controller includes a primary control unit CNTRA that is intended to issue control signals $S_{CC1}$, $S_{CC2}$, $S_{TA1}$, $S_{TA2}$ presuming normal operating conditions. The controller CNTRL further includes a safety control unit CNTRS. The latter is reserved to modify the control signals from the control unit CNTRA if it detects an unsafe situation. By providing the controller as a combination of a primary control unit CNTRA and a safety control unit CNTRS that is capable of overruling the primary control unit the risk that programming and/or hardware errors related to other control functionalities could impair the reliability of the safety functionality is strongly reduced.

In the embodiment shown in FIG. 3, the primary control unit CNTRA receives an input signal Sij from a gear select unit GS. The gear select unit may for example respond to manual input by a driver or may automatically generate the input signal Sij indicative for a desired gear. If a current setting for the transmission ratio does not correspond to a desired gear indicated by the input signal Sij, the primary control unit issues control signals $S_{CC1}$, $S_{CC2}$, $S_{TA1}$, $S_{TA2}$ with which the non active one of the partial transmissions can be set to a desired transmission ratio and subsequently assumes a transitional control mode to achieve a smooth transition to a transmission via that partial transmission. Subsequent to the smooth transition it assumes a locked control mode wherein it maintains the controllable clutch associated with the target partial transmission in a coupled, non-slipping state until a subsequent gear shift is requested.

The safety control unit CNTRS comprises a detector DET, which receives an input Sacc from an acceleration sensor Asens. The acceleration sensor may for example be an inertial sensor or a differentiator which derives an indication for the acceleration from a velocity signal for example. The detector may verify whether a value of an acceleration as indicated by the input signal Sacc is less than a negative threshold value, for example, less than $-2$ m/s$^2$. In that case it issues a signal Sxc indicative for this condition, and modifies the control signals $S_{CC1}$, $S_{CC2}$ into $S_{CA1}$, $S_{CA2}$. This has the effect that the controller CNTRL assumes a safety operational mode. In case the inadvertent situation would occur wherein the partial transmission systems are in a windup power loop, a strong deceleration of the vehicle would result. As the strong deceleration is detected by the detector DET of the safety controller CNTRS, and the latter overrules the primary controller CNTRA, one of the controllable clutches is decoupled by intervention of the decoupling control element DA1, DA2. Therewith any potential windup power loop is removed. The safety controller may be configured to maintain the safety control mode until it assumes the locked control mode to avoid a repetition of the windup.

The decoupling control element DA1 causes the clutch actuator CA1 to instantly decouple the first clutch if the signal SCC1 indicates it is the off-going clutch and the signal SXC indicates that the detector detected an excessive deceleration. In that case safety control mode M122 is assumed. It will also cause the clutch actuator CA1 to decouple the first clutch if the signal SCC1 indicates it is the on-going clutch and the signal SXC persists longer than a predetermined time-interval and the absolute value of the angular acceleration of the engine driving the input exceeds the maximum value. In that case safety control mode M0 is assumed.

Likewise, the decoupling control element DA2 causes the clutch actuator CA2 to instantly decouple the second clutch if the signal SCC2 indicates it is the off-going clutch and the signal SXC indicates that the detector detected an excessive deceleration. In that case safety control mode M211 is assumed. It will also cause the clutch actuator CA2 to decouple the second clutch if the signal SCC2 indicates it is the on-going clutch and the signal SXC persists longer than a predetermined time-interval and the absolute value of the angular acceleration of the engine driving the input exceeds the maximum value. In that case safety control mode M0 is assumed.

Normally the controller will decouple the off-going clutch in case an excessive deceleration is detected during the transitional control phase. Accordingly, instead of gradually decoupling the off-going clutch as would be the case during a transitional control mode it instantly decouples that clutch.

It may be contemplated to have an exception in case of a power-on downshift. In that case it would be an option to decouple the on-coming clutch and allowing the off-going clutch to slip until the rotational speed of the engine is synchronized with the rotational speed corresponding to the selected lower transmission ratio and subsequently close the oncoming clutch while simultaneously decoupling the off-going clutch. For safety reasons it is however recommended that there are no exceptions to the rule that it is always the off-going clutch that is decoupled when entering a safety operational mode.

An operation of the transmission system is now described in more detail with reference to FIG. 4. In this example it is assumed that the controller CNTRL (CNTRA+CNTRS) has assumed the first locked operational mode M1.

Figure 4:
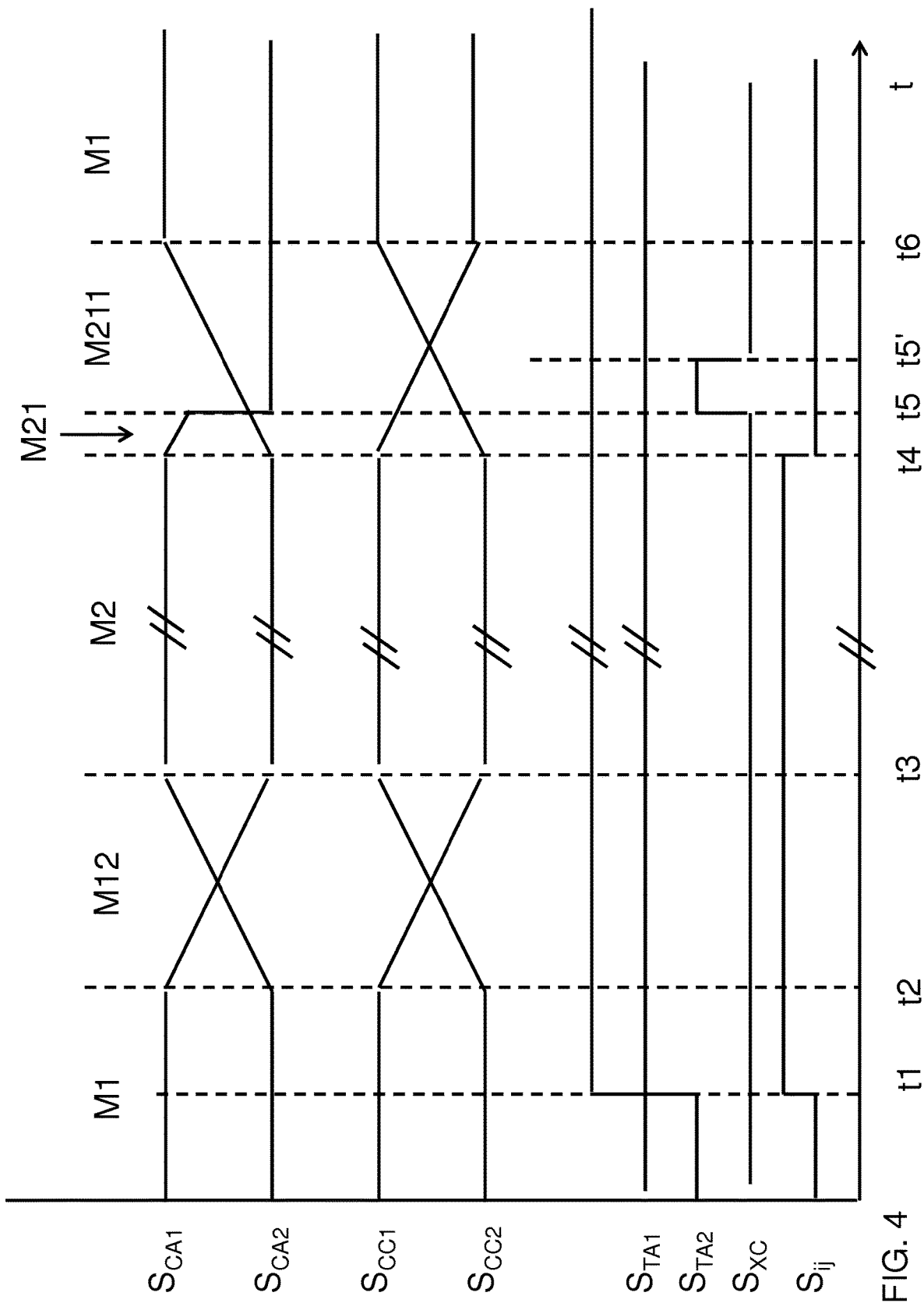
FIG. 4 shows exemplary signals during operation of the controller.

FIG. 4 shows various control signals of the embodiment of FIG. 3 in a time-interval t1-t6.

At point in time t1, the controller CNTRL is in the first locked operational mode M1, wherein the first clutch locked, so that the transmission takes place via the first partial transmission. When the primary control unit CNTRA receives an input signal Sij from a gear select unit GS it issues a control signal STA2 to the second partial transmission to cause the latter to assume a setting wherein it is capable to provide the transmission ratio as specified by the input signal Sij. At point in time t2, the second partial transmission has assumed that setting and the primary control unit CNTRA issues a first control signal SCC1 that is to cause the actuator CA1 to gradually decouple the first clutch and issues a second control signal SCC2 that is to cause the actuator CA2 to gradually decouple the second clutch. As the detector DET of the safety controller CNTRS does not detect an excessive deceleration, it does not overrule the operation of the primary control unit CNTRA and simply passes the control signals SCC1, SCC2 as SCA1, SCA2. Therewith the controller CNTRL provides for a transition from the first control mode M1 to the second control mode M2, via the first transitional control mode M12. At point in time t3, the controller CNTRL has assumed the second control mode M2. Now it is presumed that at point in time t4 the primary control unit CNTRA receives an input signal Sij from the gear select unit GS that request a selection of the previous transmission ratio. Provided that the settings of the first partial transmission were not changed, the primary control unit CNTRA issues a first control signal SCC1 that is to cause the actuator CA1 to gradually couple the first clutch and issues a second control signal SCC2 that is to cause the actuator CA2 to gradually couple the second clutch. Until point in time t5, the detector DET of the safety control unit CNTRS does not detect an excessive deceleration. Hence, similar to the situation during the time interval t2-t3 does not overrule the operation of the primary control unit CNTRA and simply passes the control signals SCC1, SCC2 as SCA1, SCA2. Therewith the controller CNTRL provides for a transition from the second control mode M2 to the first control mode M1, via the second transitional control mode M21. However at point in time t5, the detector DET detects an excessive deceleration. In response to the control signal SXC the decouple control unit DA2 causes the second clutch actuator CA2 to instantly decouple the second clutch. Therewith the controller CNTRL assumes the second safety operational mode. As a result the excessive deceleration ends on point in time t5'. To prevent a repetition of states, the decouple control unit DA2 may maintain the signal SCA2 at the value of t5, to maintain the second clutch in the decoupled mode. Once the controller achieves the first control mode M1 it may reset the decouple control unit DA2, so that it will normally pass the control signal SCC2 as long as no new excessive deceleration is detected.

Figure 5:
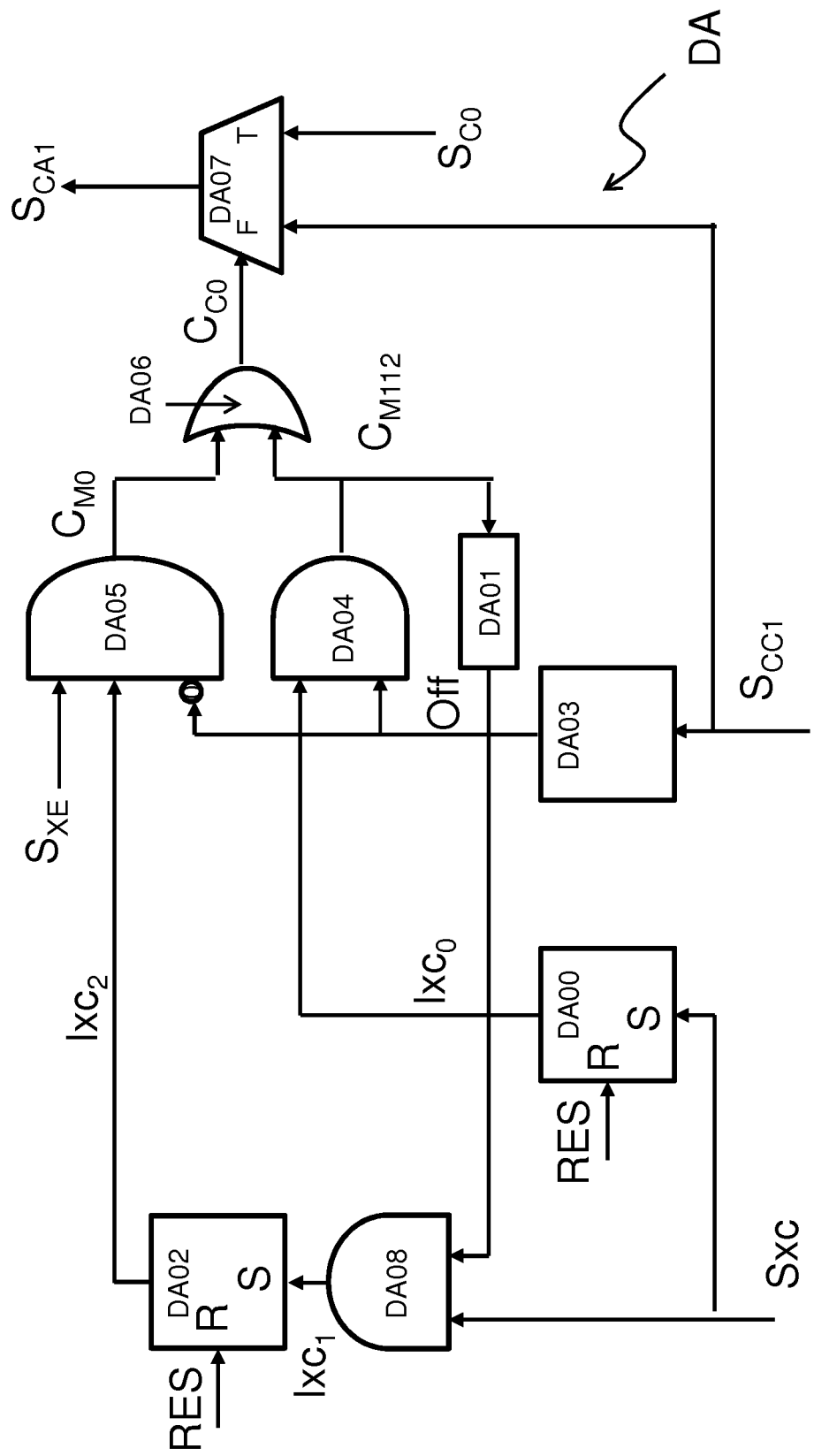
FIG. 5 shows an exemplary embodiment of an aspect of the controller.

FIG. 5 shows an exemplary embodiment of a decouple unit DA, here arranged as the decouple unit DA1. The embodiment is also applicable to serve as the decouple unit DA2. In that case the input signal SCC1 is replaced with the input signal SCC2 and the output signal SCA1 is replaced with the output signal SCA2. It is noted that the various elements are presented as individual hardware components. Alternatively the exemplary embodiment may be provided as a suitably programmed microcontroller for example. In the embodiment shown a first RS-flipflop DA00 receives the control signal SXC at its input, and provides an output signal IXC0=true if it is set by the control signal SXC. A state detector DA03 indicates whether the clutch controlled by input signal SCC1 is an off-going clutch and issues a signal OFF=true, if this is the case. The state detector DA03 may for example detect this from a gradient in the input signal SCC1 or may alternatively receive an indication signal from the primary controller CNTRA for that purpose. AND-gate DA04 issues a control signal CM112 if both the output signal IXC0 and the output signal OFF are true. The OR-gate DA07 issues an output signal CC0=true if one of its inputs is true, in which case the control signal SC0 is selected by selection element DA07 as the output signal SCA1. For enabling the controller to assume the further safety control mode M0, the decouple unit DA comprises as further elements a timer DA01, an AND-gate DA08, an SR-flipflop DA02 and an AND gate DA05. The timer DA01 provides a delayed version (e.g. 100 ms) of the control signal CM112 and a logical AND operation with the control signal SXC is performed by AND-gate DA08. If it is the case that the control signal SXC is still true after the delayed version of the control signal CM112 has become true, then SR-flipflop is set. A logical AND operation of the output signal IXC2 of this SR-flipflop with the negated output signal of the state detector DA03 is performed by AND gate DA05. The AND gate has as further input a signal $S_{XE}$ which indicates whether the absolute value of the angular acceleration of the engine driving the input exceeds the maximum value. If the state detector DA03 indicates that the clutch is oncoming (OFF=false) and IXC2=true and further $S_{XE}$ is true, then output signal CM0 of AND-gate DA05 is true, signifying that the further safety control mode M0 is assumed, in which case the output signal CC0 also causes the selection element DA07 to select SC0 as its output signal SCA1, instead of signal SCC1.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention claimed is:

1. A transmission system for a vehicle, comprising:
a first partial transmission with a first controllable clutch and a second partial transmission with a second controllable clutch each forming a respective transmission path between an input and a common output, the first and the second controllable clutches having a first actuating means and a second actuating means respectively, to control an operational state of said first and second controllable clutches,
a controller to control the first actuating means and the second actuating means, the controller being configured to selectively assume one of a plurality of control modes including:
a first locked control mode wherein the first and the second controllable clutches are maintained in a coupled state and in a decoupled state respectively,
a second locked control mode wherein the first and the second controllable clutches are maintained in the decoupled state and in the coupled state respectively,
a first transitional control mode, wherein the first and the second controllable clutches are controlled to gradually assume the decoupled state and the coupled state respectively, and
a second transitional control mode, wherein the first and the second controllable clutches are controlled to gradually assume the coupled state and the decoupled state respectively,
wherein each of the first and the second transitional control modes comprises a stage wherein the first and the second controllable clutches simultaneously have a partially coupled state, characterized in that the plurality of control modes further includes a plurality of safety control modes, the controller configured to select one of the plurality of safety control modes instead of the first transitional control mode or the second transitional control mode upon detecting that a value of an acceleration of the vehicle is lower than a negative threshold value, the plurality of safety control modes comprising one or more of:
- a first safety control mode wherein the first controllable clutch is in the decoupled state and the second controllable clutch is in the partially coupled state,
- a second safety control mode wherein the first controllable clutch is in the partially coupled state and the second controllable clutch is in the decoupled state, wherein the first safety control mode and/or the second safety control mode comprises bounding an absolute value of an angular acceleration of an engine driving the input to a predetermined maximum value, and
- a further safety control mode, in which said further safety control mode the controller issues control signals to direct both the first and the second controllable clutches to assume a decoupled operational state, the controller assuming the further safety control mode upon detecting in the first or the second safety control mode that the value of the acceleration of the vehicle persists to be lower than the negative threshold value and the absolute value of the angular acceleration of the engine driving the input exceeds the predetermined maximum value.

2. The transmission system according to claim 1, wherein the controller comprises a first control unit that is configured to control the first and second controllable clutches in accordance with an operational mode selected from the first locked control mode, the second locked control mode, the first transitional mode and the second transitional mode and comprises a second control unit that is configured to overrule the first control unit by selecting one of the first safety control mode or the second safety control mode instead of the transitional control mode upon detecting that the value of the acceleration of the vehicle is lower than the negative threshold value.

3. A transmission method for a vehicle, comprising:
controllably coupling via a controller a first partial transmission with a first controllable clutch and a second partial transmission with a second controllable clutch between an input and a common output, in accordance with an control mode selected from a plurality of control modes including: a first locked control mode wherein the first and the second controllable clutches are maintained in a coupled state and in a decoupled state respectively, a second locked control mode wherein the first and the second controllable clutches are maintained in the decoupled state and in the coupled state respectively, a first transitional control mode wherein the first and the second controllable clutches are controlled to gradually assume the decoupled state and the coupled state respectively, and a second transitional control mode wherein the first and the second controllable clutches are controlled to gradually assume the coupled state and the decoupled state respectively, wherein each of the first and the second transitional control modes comprises a stage wherein the first and the second controllable clutches simultaneously are in a partially coupled state,
characterized in that the plurality of control modes further includes a plurality of safety control modes, the transmission control method selecting one of the plurality of safety control modes instead of the first transitional control mode or the second transitional control mode upon detecting that a value of an acceleration of the vehicle assumes a value lower than a negative threshold value, the plurality of safety control modes comprising one or more of: a first safety mode wherein the first controllable clutch is in the decoupled state and the second controllable clutch is in a slipping state, a second safety mode wherein the first controllable clutch is in the slipping state and the second controllable clutch is in the decoupled state, wherein the first safety control mode and/or the second safety control mode comprises bounding an absolute value of an angular acceleration of an engine driving the input to a predetermined maximum value, and a further safety control mode, the controller assuming the further safety control mode upon detecting in the first or the second safety control mode that the value of the acceleration of the vehicle persists to be lower than the negative threshold value and the absolute value of the angular acceleration of the engine driving the input exceeds the predetermined maximum value.

4. The transmission method according to claim 3, wherein the transmission control method further comprises selecting via the controller the first safety control mode if a value of an acceleration of the vehicle lower than the negative threshold value is detected during the first transitional control mode, and selecting the second safety control mode if a value of an acceleration of the vehicle lower than the negative threshold value is detected during the second transitional control mode.

* * * * *